TRANSISTOR VIDEO ENHANCEMENT AMPLIFIER WITH R-C PEAKING CONTROL

Filed Aug. 19, 1968 2 Sheets-Sheet 1

SAMUEL SAKOWITZ
INVENTOR.

BY Popper, Bain + Bobis
Attys

SAMUEL SAKOWITZ
INVENTOR.
BY Popper Bain + Bobis
Attys

United States Patent Office 3,535,648
Patented Oct. 20, 1970

3,535,648

TRANSISTOR VIDEO ENHANCEMENT AMPLIFIER WITH R-C LEAKING CONTROL

Samuel Sakowitz, New York, N.Y., assignor to A-V Systems, Inc., Glen Head, N.Y., a corporation of New Jersey Filed Aug. 19, 1968, Ser. No. 753,364
Int. Cl. H03f *3/04*; H03g *9/24*
U.S. Cl. 330—21 14 Claims

ABSTRACT OF THE DISCLOSURE

A video enhancement amplifier is provided which includes first, second and third stages, with the first stage including a transistor with peaking control means in the nature of an RC network connected thereto. The RC network comprises variable resistance means to provide for variable resistance peaking and the attendant capability of selectively varying the circuit frequency response and, thus, enable increase in the latter without giving rise to undesirable phenomena in the nature of appreciable increase in noise to signal ratio. The second stage is constituted by a solid state amplifier with variable gain control, and the third stage is an emitter follower output stage which provides for impedance matching.

BACKGROUND OF THE INVENTION

This invention relates to a new and improved wideband or video amplifier which is particularly adapted to the enhancement of video signals.

Although video amplifiers are, of course, very well known in the prior art, the same will generally be found to incorporate therein as peaking control circuit elements, peaking coils in the nature of fixed and variable inductances, and variable capacitances and the like, with the result tht undesirable phenomena in the nature of increase in noise to signal ratio, signal phase shift, ringing or oscillation, or smear result when it is attempted to increase the bandpass thereof to in essence nullify any increase in picture resolution provided by the said increased bandpass.

More specifically, it may be understood that peaking coils in the nature of variable inductances are prone to experience changes in the resistance and inductance values thereof, due to coil heating after long periods of usage thereof, to result in signal phase shift and general circuit instability, while variable capacitances experience marked tendencies to provide for signal peaking at only certain signal frequencies while experiencing signal losses at others.

Because of the above, it may be understood that significant losses in displayed signal bandwidth or horizontal resolution as distinguished from vertical resolution which is, of course, fixed by the design and operation of the display device sweep circuits, are experienced in the transmission of video signals from camera means to display means. Thus, considering the simple case of a video camera which is directly connected to a monitor, although the video signal transmitted from the camera may be of 600 line horizontal resolutions or bandwidth quality, the limited bandpass of the prior art video amplifier means as discussed hereinabove, may result in the display of a picture having only somewhere in the neighborhood of 350 lines of horizontal resolution, with most of the signal bandwidth loss occurring with the higher frequencies components therof as a result of frequency response curve roll-off. This is to say that although somewhat more than seven megacycles of bandwidth (assuming approximately 85 lines of horizontal resolution per megacycle of bandwidth) are being transmitted and are available for display, the limitations of the prior art video amplifiers will result in the display of only little more than four megacycles thereof, with attendant significant degradation of the monitor picture quality relative to the quality of the transmitted video signal. Thus, assuming a fixed transmitted bandwidth from a camera, as measured in lines of horizontal resolution or megacycles, it may be understood that the only way the horizontal resolution of the displayed picture may be increased is by increasing the bandpass of the video amplifier without, however, the concomitant introduction of undesirable phenomena, as discussed above, which would function to nullify any increase in display picture resolution as should be obvious.

This problem of loss of bandwidth or lines of horizontal resolution is particularly acute in the dubbling of video tapes from a video tape master. Since the video tape master is of extreme value, as should be obvious, it is normal practice to dub the same from one video tape recorder to another thereby copying the master and to in turn distribute the said copies for display or further copying therefrom in like manner. With significant losses in reproduction of bandwidth or lines of horizontal resolution, as discussed hereinabove, it should become clear that the quality of the picture obtainable from the video tape copy is substantially below the quality of the picture obtainable from the video tape master, and that the quality of the picture obtainable from video tape copies which are made from the first-mentioned video tape copy is so poor as to render the same virtually useless from a commercial point of view. This is to say that by the time a copy has ben made from a copy of a video tape master, the losses in horizontal resolution of the displayable picture have assumed such significance as to render the same of decidedly and readily apparent inferior quality. This problem of loss in horizontal resolution or bandwidth is also of great significance in many of the wide variety of television applications which are generally referred to as "closed circuit" installations such as are commonly found in schools or industry, and wherein the horizontal resolution of the displayed picture may be understood to be well below the horizontal resolution or bandwidth of the video signal as transmitted from the video camera. Too, this problem of lost horizontal resolution results in significant degradation of the picture quality obtainable in the display of video signals transmitted through the use of satellites, or from a wide variety of military observational devices. Further, high frequency signal component losses as commonly occur on long coaxial cable transmission runs may also be understood to give rise to this problem of loss of horizontal resolution.

SUMMARY OF THE INVENTION

It is, accordingly, an object of this invention to provide a video enhancement amplifier of high bandpass, having a peaking control constituted by an RC network to enable the frequency response thereof to be selectively increased to extend the flatness of the frequency response curve over a much higher range of frequencies, whereby the said amplifier will function to enhance transmitted video signals to result in the provision of a crisp picture embodying substantially the same number of lines of horizontal resolution or megacycles of bandwidth as are available in the transmitted signal, all without degeneration of the low frequency response.

Another object of this invention is the provision of a video enhancement amplifier which functions as above substantially without giving rise to undesirable picture-quality-degrading phenomena in the nature of increase of noise to signal ratio, phase shift, ringing or oscillation, or smear or the like.

Another object of this invention is the provision of a video enhancement amplifier as above of extremely stable operational characteristics.

Another object of this invention is the provision of a video enhancement amplifier as above having means for providing line equalization, and which is capable of increasing the bandwidth of a video display device beyond the design limits thereof.

A further object of this invention is the provision of a video enhancement amplifier as above which requires the use of only relatively inexpensive, and readily available components of proven dependability.

A still further object of this invention is the provision of a video enhancement amplifier as above which is particularly, though by no means exclusively, adapted for use in conjunction with the dubbing of viedo tapes from one video tape recorder to another without measurable loss in horizontal resolution.

BRIEF DESCRIPTION OF THE INVENTION

As currently preferred, the video enhancement amplifier of this invention is constituted by a solid state circuit which is of strictly RC design and does not include therein any peaking coils in the nature of fixed or variable inductances, or any variable capacitances. The circuit comprises first, second and third stages with the first stage including a transistor with peaking control means in the nature of an RC network connected thereto. The RC network comprises variable resistance means to provide for variable resistance peaking and the attendant capability of selectively varying the circuit frequency response and amplitude above one megacycle without giving rise to undesirable phenomena in the nature of appreciable increase in noise to signal ratio. The second stage is constituted by a solid state amplifier with variable gain control, and the third stage is constituted by an emitter follower output stage which provides for impedance matching to insure proper output impedance. Means are provided to insure that the high frequency response of the amplifier is maintained in all stages.

The above and other objects and advantages of this invention are believed made clear by the following detailed description thereof taken in conjunction with the accompanying drawings wherein:

DETAILED DESCRIPTION OF THE INVENTION

Figure 1:
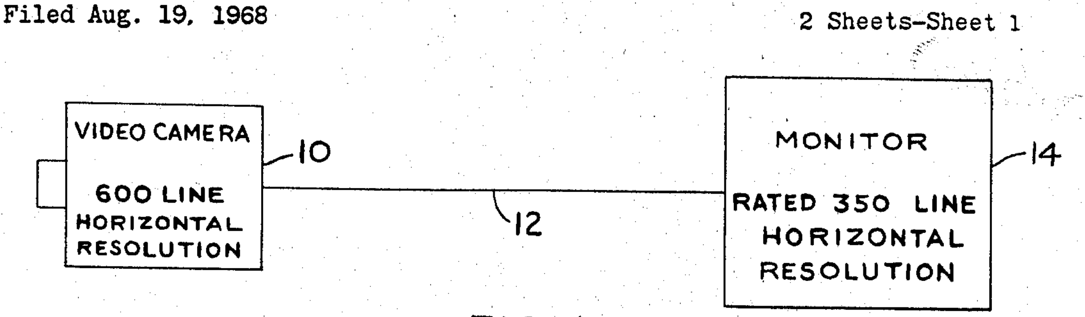
FIG. 1 is a block diagram of a video camera connected to a monitor.

Referring now to the FIG. 1, a video camera 10 is connected in conventional manner by coaxial cable, as indicated at 12, to a monitor 14. In accordance with the state of the prior art, it may be understood that the video camera 10 is capable of transmitting a video signal of approximately 600 lines of horizontal resolution or approximately 8 megacycles of bandwidth, while the monitor 14 is rated at only 350 lines of horizontal resolution or approximately a little better than four megacycles of bandwidth. Accordingly, and in conformance with currently acceptable transmission and display procedures, it may be understood that the monitor 14 will display a picture having only 350 lines of horizontal resolution with the result that approximately 250 lines of horizontal resolution or 3 megacycles of bandwidth, which are available for display will be wasted with attendant lack of crispness in the picture displayed.

Figure 2:
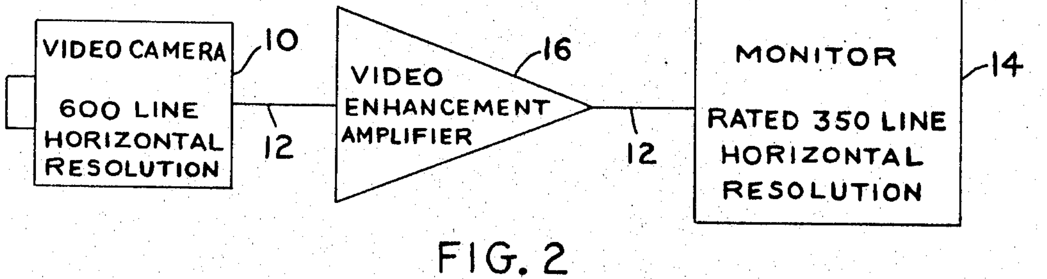
FIG. 2 is a block diagram in the nature of FIG. 1 and illustrates the interposition of a video enhancement amplifier constructed in accordance with the principles of this invention between the said video camera and monitor.

Referring now to FIG. 2, the video camera is again indicated at 10, the monitor at 14, and the coaxial transmission cable at 12. In this instance, however, a video enhancement amplifier 16 constructed in accordance with the principles of this invention may be seen to have been interposed between the video camera 10 and the monitor 14 with the result that, even though the monitor 14 is rated at only 350 lines of horizontal resolution, the fact that 600 lines of horizontal resolution or approximately 7 megacycles of transmitted signal bandwidth are available will result in the display of a picture by the monitor 14 which will show 600 lines of horizontal resolution and will thus embody significantly increased crispness and eye-appeal as should be obvious.

Figures 3, 3A:
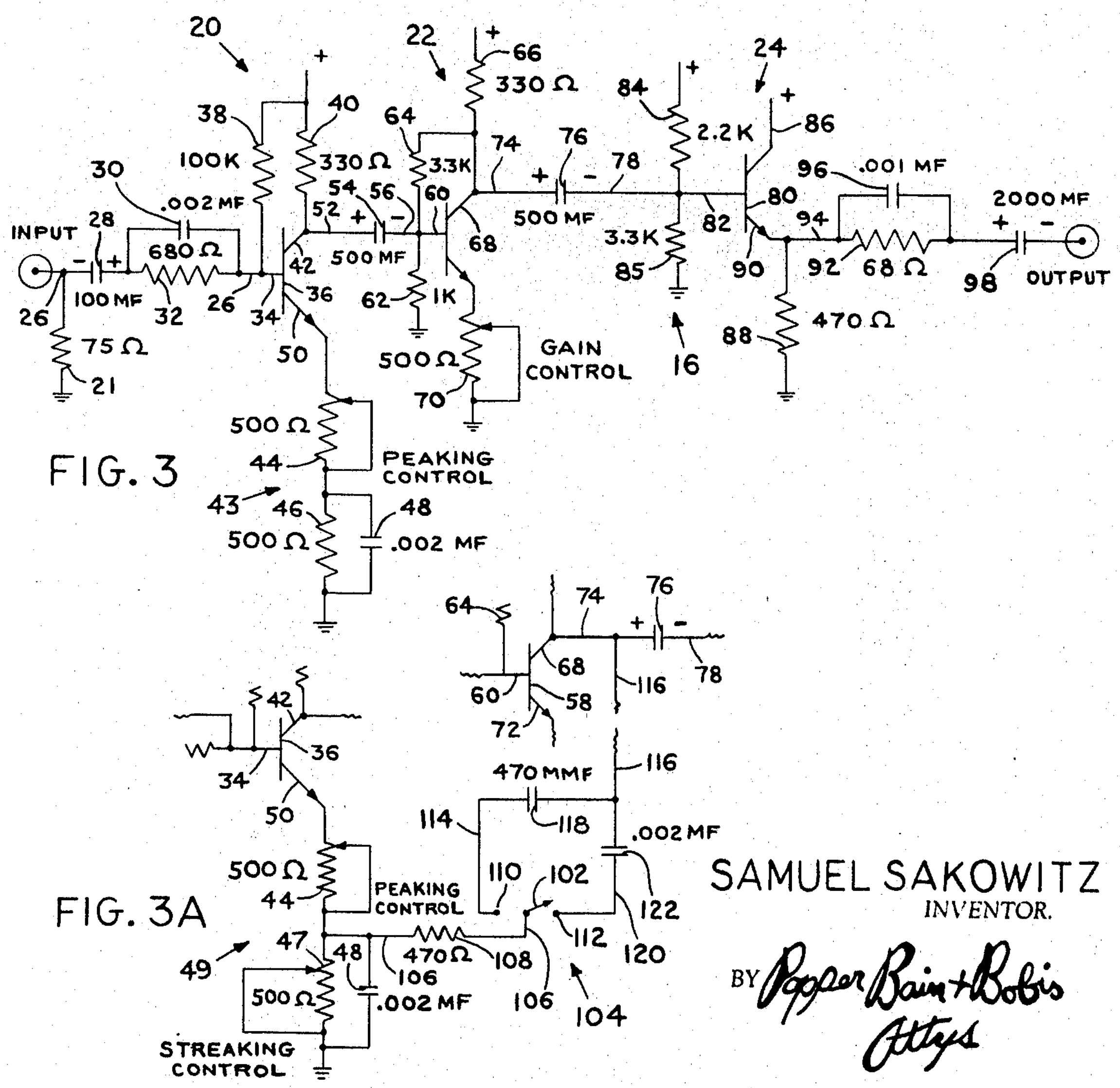
FIG. 3 is a circuit diagram of a video enhancement amplifier constructed in accordance with the principles of this invention.
FIG. 3A is a circuit diagram of a somewhat modified peaking control including streaking control means, for use in the amplifier circuit of FIG. 3.

Referring now to the schematic circuit diagram of FIG. 3, which depicts a currently preferred form of a video enhancement amplifier 16 constructed in accordance with the principles of this invention, the same may be seen to comprise a first stage as indicated generally at 20, a second stage as indicated generally at 22, and a third stage as indicaed at 24. Prior to detailed description of the circuit of FIG. 3, it is to be noted, that although certain resistance and capacitance values are indicated in the said figure for the respective resistors and capacitors included therein, it is to be clearly understood that such values are intended as representative, only, of resistance and capacitance values which have proven preferable for a variety of applications of the said circuit, and that it is contemplated and expected that resistors and capacitors of other and different resistance and capacitance values could and will be utilized in the said circuit for other and different applications thereof.

Referring now to the first stage 20, the same may be seen to include a video signal input line 26 in which is interposed an AC coupling capacitor 28 which functions to isolate the circuit from D.C. A resistor 21 is connected as shown to the input line 26 to provide an input impedance of 75 ohms for obvious purposes. A capacitor 30 and resistor 32 are connected as shown in parallel in video signal input line 26, and the latter is connected to the base lead 34 of an NPN transistor 36. The parallel connected capacitor 30 and resistor 32 function to bring the video signal level down to the proper amplitude for the transistor 36. This is to say that the capacitor 30 and resistor 32 reduce the level of the video signal to a point at which the latter may be accepted by the transistor 36. In addition, the capacitor 30 maintains the video signal bandwidth, by maintaining the high freqeuncy components thereof at this same level, so that the transistor 36 "sees" a proper video signal without loss in signal bandwidth.

A resistor 38 is connected as shown to the base lead 34 of the transistor 36 to establish proper bias for the latter, and a collector load resistor 40 is connected as shown to the collector lead 42 of the transistor 36 to provide for the proper rise time of the latter. As indicated, each of the resistors 38 and 40 are connected to the plus side of the non-illustrated power supply.

An RC network 43 comprising a variable resistor 44, and parallel connected resistor 46 and capacitor 48, is series connected as shown to the emitter lead 50 of the transistor 36. As indicated, the RC network 43 functions as a peaking control in that variations in the resistance value of the variable resistor 44 will function to establish a range of integrating times to increase the bandpass or rise time of the transistor 36. Accordingly, it is made possible, without the use of peaking coils in the nature of variable or fixed inductors, or variable capacitors, to selectively increase the overall frequency response of the amplifier to compensate for roll-off of the higher frequency signal components with attendant increase in bandwidth and without degeneration of the low frequency response. As a result, this increase in bandwidth, as made possible through proper adjustment of the variable resistor 44 of the peaking control RC network 43, will substantially not be accompanied by undesirable phenomena in the nature of appreciable increase in noise to signal ratio, ringing or oscillation, signal phase shift, or smear to thus provide for significant improvement over the very high frequency amplifiers of the prior art wherein any significant increase in bandwidth is generally at least accompanied by significant increase in the noise to signal ratio with attendant adverse effect upon picture quality as should be obvious.

The output from the first stage 20 is AC coupled, through output line 52 and capacitor 54, to the input line 56 of the second stage 22. An NPN transistor 58 provides the said second stage, and includes a base lead 60 which is connected as shown to the input line 56. Biasing resistors 62 and 64 are connected as shown to the base lead 60 of the transistor 58 to provide for proper bias of the latter, and a collector load resistor 66 is connected as shown to the collector lead 68 of the transistor 58 and functions to provide for proper output from the latter by maintaining the frequency response thereof at a desired level. As indicated, the collector load resistor 66 is connected to the plus side of the non-illustrated power supply.

A variable resistor 70 is connected as shown to the emitter lead 72 of the transistor 58 and functions as a gain control therefor as indicated on the drawings. This provision of gain control for the second stage transistor 58 is of added importance here in that adjustment of the peaking of the transistor 36 of the first stage, through adjustment in the resistance value of the peaking control variable resistor 44 as discussed hereinabove, can also function to effect a change in the gain of the first stage 20, whereupon it may be understood that the gain control variable resistor 70 may readily be adjusted to compensate for any variation in gain in the first stage 20, as well to thus enable the maintenance of a desired gain for the first and second stages of the amplifier circuit. For most circuit applications, it is to be understood that the said gain control will be adjusted to provide for unity gain.

The output from the second stage 22 is AC coupled, through output line 74 and capacitor 76, to the input of the third stage 24 as indicated by line 78. The third or emitter follower output stage 24 is provided by an NPN transistor 80 which includes a base lead 82 connected as shown to the third stage input line 78. Biasing resistors 84 and 85 are connected as shown to the base lead 82 of the transistor 80 to provide proper bias for the latter, while the collector lead 86 of the transistor 80 is directly connected as indicated to the plus side of the non-illustrated power supply. Additional bias for the transistor 80 is provided by a resistor 88 which is connected as shown to the emitter lead 90 of the former to function as part of the emitter return. Since, as disclosed herein, the emitter return of the transistor 80 will be in the range of 5 to 8 ohms, a transistor stage 24 is provided to maintain an output of 75 ohms in accordance with standard practice. A capacitor 96 is connected as shown in parallel with the resistor 92 and functions to enable the maintenance of the desired high frequency response. A capacitor 98 is interposed in the third stage output line 94 to provide for the AC coupling of the amplifier output signal to the input of a video device.

Figure 4:
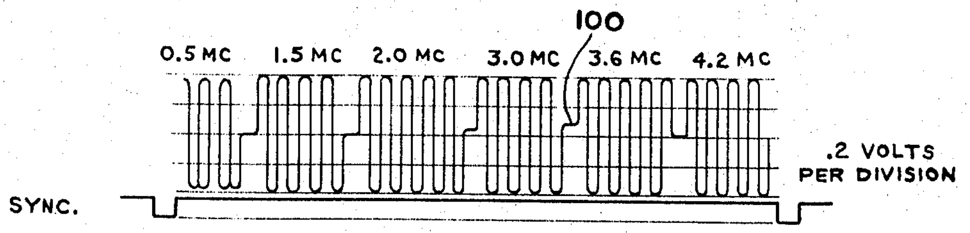
FIG. 4 depicts a keyed-burst signal waveform for one horizontal scan line as applied to the input of the video enhancement amplifier of FIG. 2.
Figure 5A:
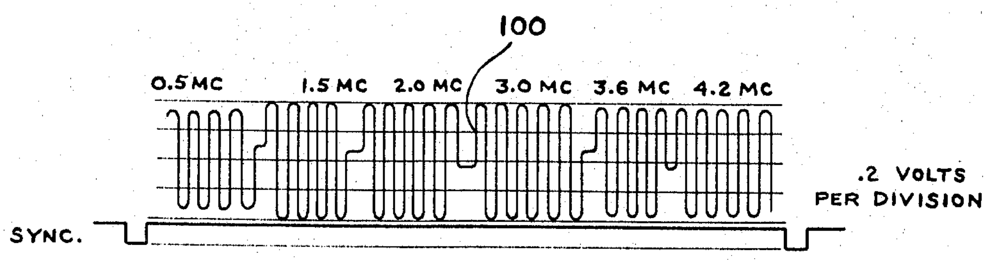
FIG. 5A depicts the resultant amplifier output signal waveform with the video enhancement amplifier of FIG. 2 set at the lowest peaking setting thereof.
Figure 5B:
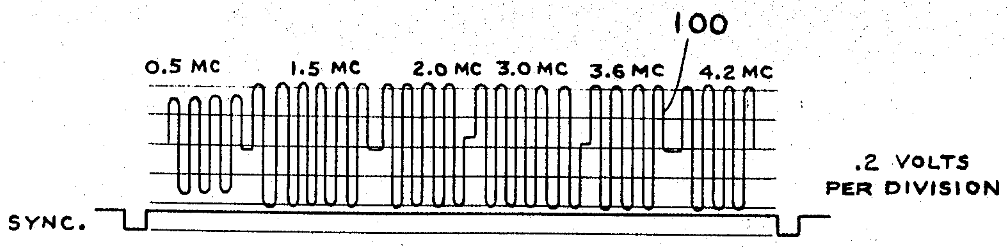
FIG. 5B depicts the resultant amplifier output signal waveform with the video enhancement amplifier of FIG. 2 adjusted to the mid peaking setting thereof.
Figure 5C:
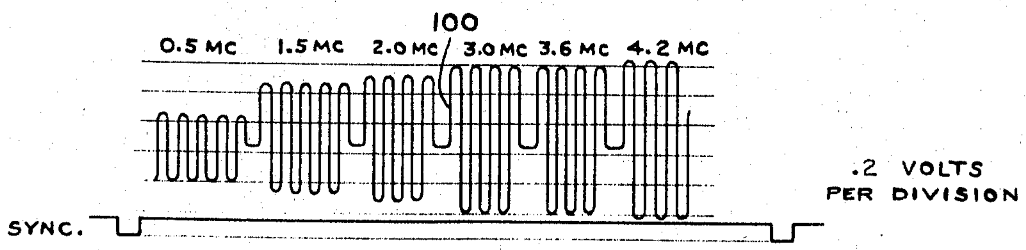
FIG. 5C depicts the resultant amplifier output signal waveform with the video enhancement amplifier of FIG. 2 adjusted to the high peaking setting thereof.

The markedly superior performance provided by the video enhancement amplifier of this invention is believed clearly illustrated by FIGS. 4 and 5A through 5C, respectively. Referring first to FIG. 4, it may be understood that the wave form 100 depicted therein would be representative of a keyed burst signal input, as seen on an oscilloscope, to the video enhancement amplifier 16 of FIG. 2 for one horizontal scan line of the monitor 14. As indicated, this signal includes components ranging from approximately 0.5 megacycle to approximately 4.2 megacycles, whereby it may be understood that each burst is representative of the frequency response curve of the amplifier circuit to signal components of the indicated frequency. This same signal or waveform 100 is seen in FIG. 5A, at the output from the video enhancement amplifier 16 with the peaking control variable resistor 44 of the latter set at the lowest peaking setting therefor, while the same signal or waveform 100 is seen in FIG. 5B at the output of the video enhancement amplifier 16 with the peaking control variable resistor 44 of the latter set at the mid peaking setting thereof. In FIG. 5C, this same signal or waveform 10 is seen at the output of the video enhancement amplifier 16 with the peaking control variable resistor 44 of the latter set at the high peaking setting thereof. Of particular significance with regard to FIGS. 5A through 5C, and especially with regard to FIGS. 5B and 5C which illustrate the results obtainable with the video enhancement amplifier peaking control set respectively to the mid and high peaking settings thereof, is the fact that the frequency response of the video enhancement amplifier is significantly increased to extend the flatness of the frequency response curve over a much higher range of frequencies as is believed particularly apparent for the higher frequency components of the signal or waveform 100 which range from 3.0 megacycles to 4.2 megacycles. Thus, it is believed made clear whereby through the use of a peaking control which is constituted by an RC network, only, a video enhancement amplifier is provided which embodies a substantially flat frequency response curve, over a very wide range of signal frequencies, and substantially eliminates the wide-spread prior art problem of roll-off of the higher frequencies signal components all without degeneration of the low frequency response. By thus providing for the amplification, at uniform gain, of substantially all of the components of the video signal, including especially the higher frequency components thereof, it may be understood that the video enhancement amplifier of the invention accordingly enables the utilization by the video device or monitor 14 of all of the said video signal components to modulate the electron beam to thus, provide for beam modulation at higher capability with attendant significant increase in picture crispness and overall quality as should be obvious.

Referring now to FIG 3A, a somewhat modified RC network, which again functions as the amplifier circuit peaking control, is indicated generally at 49. In addition, the RC network 49 provides a measure of streaking control as described in detail hereinbelow.

In the manner of RC network 43 of FIG. 3, the RC network 49 of FIG. 3A, comprises variable resistor 44 connected as indicated to the emitter lead 50 the NPN transistor 36. Parallel connected capacitor 48 and variable resistor 47 are connected as indicated between the variable resistor 44 and ground.

The center pole or arm 102 of a three-position switch, as indicated generally at 104, is connected as shown by line 106 to the parallel connected variable resistor 47 and capacitor 48, and a resistor 108 is connected in the line 106.

Further included in the three-position switch 104 are poles 110 and 112. A line 114 connects switch pole 110 to a line 116 which is in turn connected as indicated on the drawings to second stage output line 74, and a capacitor 118 is interposed therein. In like manner, a line 120 connects switch pole 112 to line 116, again for connection by the latter to output line 74 of second stage transistor 58, and a capacitor 122 is interposed in line 120.

By this construction and arrangement of the switch 104 it is believed made clear whereby the said switch will have a first "on" position in which switch arm 102 contacts switch pole 110 to connect the parallel connected variable resistor 47 and capacitor 48, the resistor 108, and the capacitor 118 in series to the second stage output line 74; and whereby the said switch will have a second "on" position in which switch arm 102 contacts pole 112 to connect the parallel connected variable resistor 47 and capacitor 48, resistor 108 and capacitor 122 in series to the second stage output line 74. In addition, the switch 102 will also have a non-contacting position wherein the switch arm contacts neither of the switch poles 110 or 112.

In the operation of the amplifier circuit 16 of the invention with the peaking control 49 of FIG. 3A rather than the peaking control 43 of FIG. 3 connected therein, it may be understood that variation of the resistance value of variable resistor 44 will function as a peaking control in the same manner discussed in detail hereinabove with regard to the peaking control 43 of FIG. 3. In addition, adjustment of the resistance value of variable resistor 47 will function as a streaking control, as indicated on the drawings, by adjusting for signal phase shift. More specifically, it may be understood that streaking refers to the condition wherein white or black trailing edges appear in the displayed picture and that such streaking results primarily from phase shift in the video signal. Thus, for example, in the transmission of the video signal over long lengths of coaxial cable, video signal phase shift can result in black trailing edges in the displayed picture, and it may be understood that proper adjustment of the resistance value of variable resistor 47 can be utilized to effect line equalization and attendant elimination of the said black trailing edges by effecting signal phase shift in the amplifier circuit to compensate for the signal phase shift caused by said line transmission.

The function of the three position switch is to enable the connection of a selected one of the capacitors 118 and 122, which are as indicated of markedly different capacitance values, in the streaking control circuit to provide for extension of the range of the latter. Thus, and although it is, of course, impossible to completely adjust for streaking caused by video signal phase shift, it may be understood that with the switch 104 in the first "on" position thereof, the streaking control will be effective to eliminate streaking caused by video signal phase shift within a first range, and that with the switch 104 in the second "on" position thereof, the streaking control 104 will be effective to eliminate streaking caused by video signal phase shift within a second range. The switch 104 may, of course, be placed, in the non-contacting position to eliminate streaking caused by video signal phase shift within a still further third range.

With regard to the ready availability and relatively low cost of the components required in the fabrication of the video enhancement amplifier of the invention, it may be noted that, for example, readily available and relatively inexpensive transistors in the nature of those designated 2N1492 have proven eminently satisfactory for use as the respective first, second and third stage NPN transistors 36, 58 and 80.

It is to be understood that many modifications of the circuit of FIG. 3 will be apparent to those skilled in this art. Thus, for example, additional emitter follower output stages in the nature of the third stage 24 could readily be incorporated in the said circuit by suitable connection of the base leads of the NPN transistors included in such additional emitter follower stages to the third stage input line 78, in a manner believed obvious to those skilled in this art, and it is believed clear that, in such instance, the respective emitter follower output stages would function as distribution output stages. Too, it is again emphasized that the respective resistance and capacitance values indicated in FIG. 3 for the respective resistors and capacitors of the amplifier circuit are intended as representative, only, and that resistors and capacitors having other and different respective resistance and capacitance values may be substituted therefor in accordance with the requirements of particular circuit applications and the dictates of sound electrical engineering practices.

It will be apparent that many modifications and variations, in addition to those specifically noted hereinabove, may be readily effected in the depicted circuit configuration without departing from the spirit and scope of this invention as defined in the appended claims.

I claim:

1. In a video enhancement amplifier for the enhancement of video signals, a first stage comprising a transistor connected in common emitter configuration, peaking control means connected thereto, said peaking control means comprising a parallel RC network connected in the emitter circuit of said transistor and a series connected variable resistor which is effective to selectively increase the bandpass of the output of said transistor to compensate for roll-off of the higher frequency components of said video signals to increase the frequency response of said amplifier and extend the flatness of the frequency response curve over a much higher range of frequencies, all without degeneration of the low frequency response.

2. In a video enhancement amplifier as in claim 1 wherein, said transistor is of NPN configuration.

3. In a video enhancement amplifier as in claim 1 wherein, the parallel connected resistor of said parallel RC network is also a variable resistor to provide for streaking control by enabling selective variation in video signal phase shift.

4. In a video signal enhancement amplifier as in claim 3 further comprising a second stage coupled to the output of said first stage, and capacitor means selectively connectable between the output of said second stage and the last mentioned variable resistor for varying the range of streaking control to be provided by the latter.

5. In a video signal enhancement amplifier as in claim 4, wherein, said selectively connectable capacitor means comprise first and second capacitors having different capacitance values, and switch means having at least two positions, said switch means being effective, when in said first position thereof, to connect said first capacitor to said last-mentioned variable resistor to establish one range of amplifier signal phase shift, and said switch means being effective, when in said second position thereof, to connect said second capacitor to said last-mentioned variable resistor to establish a different range of amplifier signal phase shift.

6. In a video enhancement amplifier as in claim 2, wherein, the parallel connected resistor of said parallel RC network is also a variable resistor to provide for streaking control by enabling selective variation in video signal phase shift.

7. In a video enhancement amplifier as in claim 1 further comprising a second stage, said second stage including a transistor coupled to the output of said first stage, gain control means connected thereto, said gain control means being selectively effective to compensate for any change in the gain of said first stage resulting from adjustment of said peaking control means variable resistor to thus enable the maintenance of the gain of said first and second stages at a desired level.

8. In a video enhancement amplifier as in claim 4, further comprising a second stage, said second stage including a transistor coupled to the output of said first stage, gain control means connected thereto, said gain control means being selectively effective to compensate for any change in the gain of said first stage resulting from adjustment of said peaking control means variable resistor to thus enable the maintenance of the gain of said first and second stages at a desired level.

9. In a video enhancement amplifier as in claim 7 further comprising, parallel connected capacitor and resistor at the input to said first stage with said resistor being effective to reduce the level of the video signal to a point enabling the acceptance thereof to said transistor, and said capacitor being effective to maintain the bandwidth of said video signal for introduction to said transistor.

10. In a video enhancement amplifier as in claim 8 further comprising, parallel connected capacitor and resistor at the input to said first stage with said resistor being effective to reduce the level of the video signal to a point enabling the acceptance thereof to said transistor, and said capacitor being effective to maintain the bandwidth of said video signal for introduction to said transistor.

11. In a video enhancement amplifier as in claim 9 further comprising, parallel connected capacitor and resistor at the output from said amplifier with said resistor being effective to maintain proper output impedance, and said capacitor being effective to enable the maintenance of the desired high frequency response.

12. In a video enhancement amplifier as in claim 10 further comprising, parallel connected capacitor and resistor at the output from said amplifier with said resistor being effective to maintain proper output impedance, and said capacitor being effective to enable the maintenance of the desired high frequency response.

13. In a video enhancement amplifier as in claim 4, said second stage including a transistor coupled to the output of said first stage, gain control means connected thereto, said gain control means being selectively effective to compensate for any change in the gain of said first stage resulting from adjustment of said peaking control means variable resistor to thus enable the maintenance of the gain of said first and second stages at a desired level.

14. In a video enhancement amplifier as in claim 5, said second stage including a transistor coupled to the output of said first stage, gain control means connected thereto, said gain control means being selectively effective to compensate for any change in the gain of said first stage resulting from adjustment of said peaking control means variable resistor to thus enable the maintenance of the gain of said first and second stages at a desired level.

References Cited

UNITED STATES PATENTS 3,296,546 1/1967 Schneider ---------- 330—21

ROY LAKE, Primary Examiner

S. H. GRIMM, Assistant Examiner

U.S. Cl. X.R.

178—6; 307—295; 330—28, 29, 31, 94